Sept. 9, 1958  H. C. VERNON ET AL  2,851,410
NEUTRONIC REACTOR CONSTRUCTION
Filed May 28, 1945  3 Sheets-Sheet 1

Inventors:
Harcourt C. Vernon
John J. Goett
By:
Robert A. ........
Attorney.

Sept. 9, 1958 H. C. VERNON ET AL 2,851,410
NEUTRONIC REACTOR CONSTRUCTION
Filed May 28, 1945 3 Sheets-Sheet 2
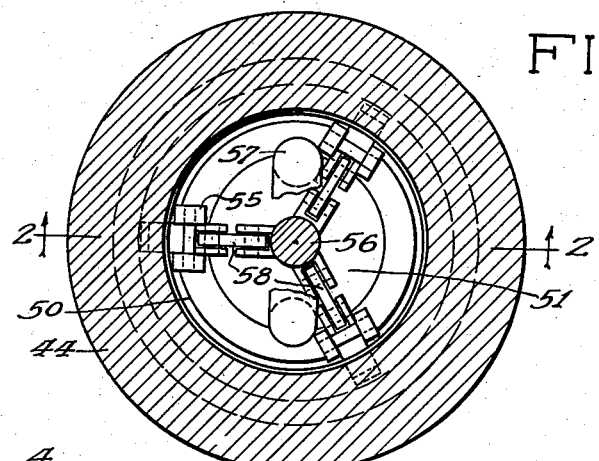
FIG. 3.
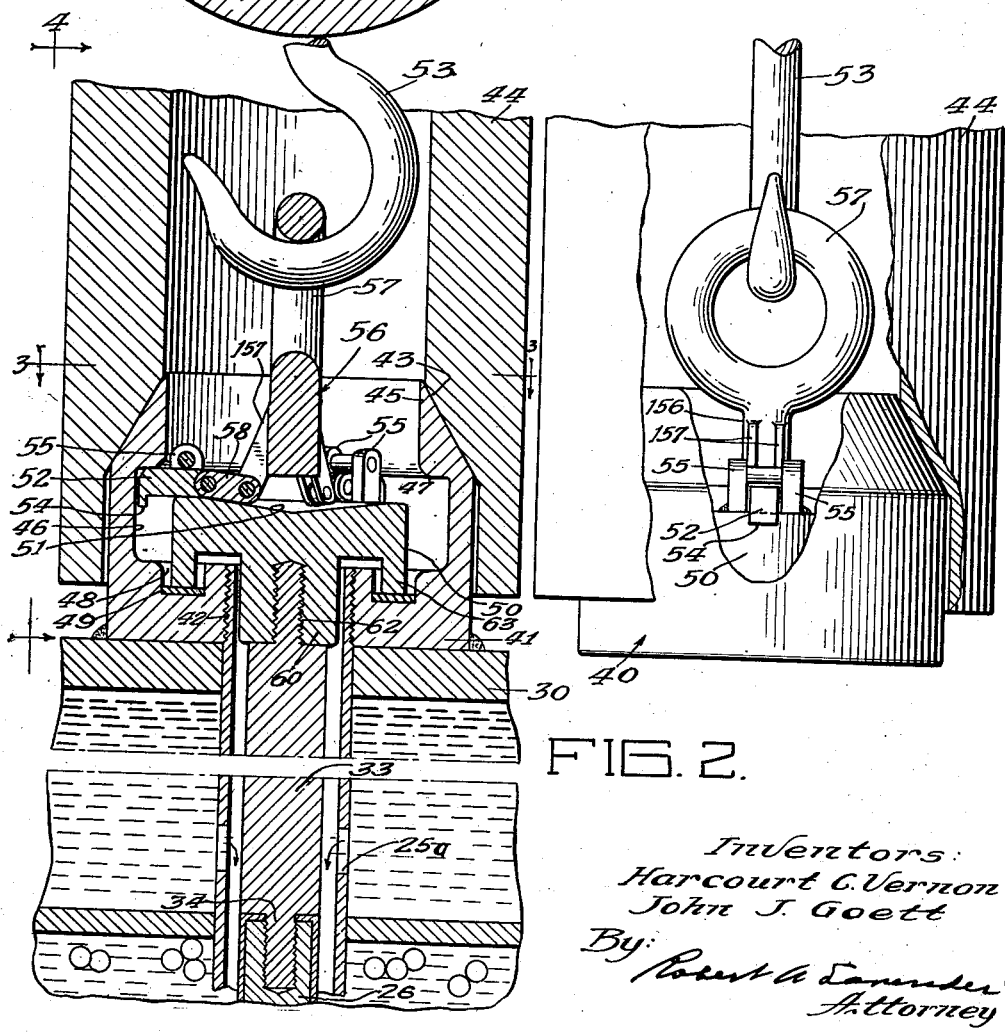
FIG. 4.
FIG. 2.
Inventors:
Harcourt C. Vernon
John J. Goett
By: Robert A. Lavender
Attorney

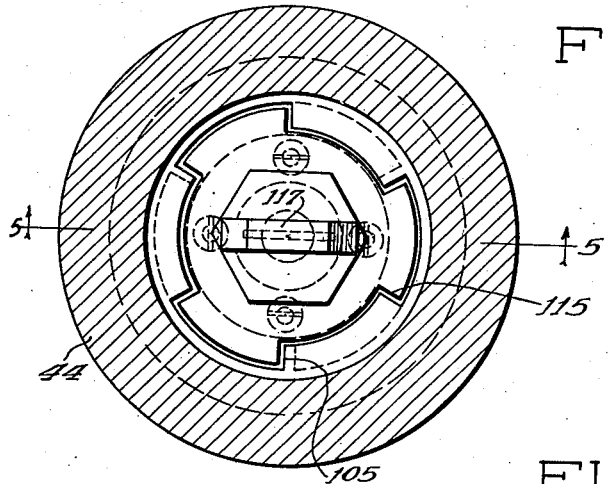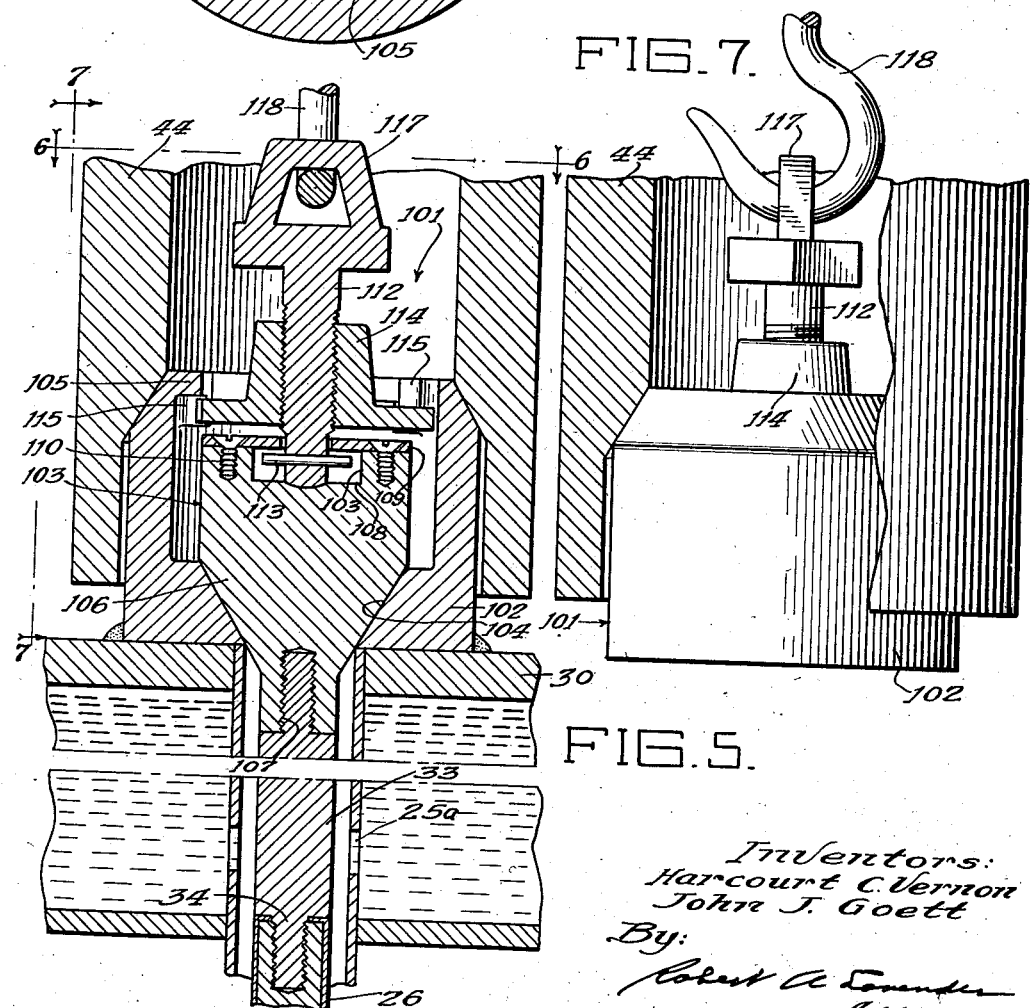

United States Patent Office 2,851,410

Patented Sept. 9, 1958

2,851,410

NEUTRONIC REACTOR CONSTRUCTION

Harcourt C. Vernon, Oak Ridge, Tenn., and John J. Goett, Chicago, Ill., assignors to the United States of America as represented by the United States Atomic Energy Commission Application May 28, 1945, Serial No. 596,220

5 Claims. (Cl. 204—193.2)

This invention relates to neutronic reactors and to novel articles of manufacture used in and in combination with such reactors. In neutronic reactors a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general, such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in Fermi et al. Patent 2,708,656, dated May 17, 1955.

In a self-sustaining chain reaction of natural uranium with slow neutrons, $92^{238}$ is converted by neutron capture to the isotope $92^{239}$. The latter in turn is converted by beta decay to $93^{239}$ and this $93^{239}$ in turn is converted by beta decay to the transuranic element $94^{239}$. By thermal neutron capture, $92^{235}$ on the other hand undergoes nuclear fission releasing energy appearing as heat and radiation, both gamma and beta; and forming fission fragments appearing as radioactive isotopes of lower mass numbers, with the release of secondary neutrons.

The neutrons thus produced by the fissioning of the $92^{235}$ nuclei have a high average energy, and must be slowed down to thermal energies in order to be in condition to cause fission efficiently in new $92^{235}$ nuclei. While some of the secondary neutrons are absorbed by uranium leading to the production of $94^{239}$, others are lost either by absorption by other materials forming the neutronic reactor or by leakage from the system. Nevertheless, enough remain to sustain the chain reaction in a system properly designed to minimize these losses.

Under these conditions, the chain reaction will not only supply the neutrons necessary for a self-sustaining neutronic reaction, but will also supply neutrons for capture by the isotope $92^{238}$ leading to the production of $94^{239}$.

The neutronic chain reaction referred to can be made self-sustaining when the reactor is made sufficiently large to equal or exceed a critical size at which the rate of neutron generation inside the reactor is equal to or greater than the rate of neutron loss from the exterior surface of the reactor. Under these conditions, a self-sustaining nuclear chain reaction can be obtained within the reactor having any neutron density desired up to infinity. However, to prevent destruction of the reactor, the heat of reaction must be controlled, and then removed by an amount providing thermal equilibrium in the reactor at some predetermined and controlled level. As the greater the rate of fission, the greater the number of neutrons that are present to produce $94^{239}$, the production of $94^{239}$ is accelerated by operating the reactor at high neutron density levels.

In one type of reactor that will be described more fully hereinafter, the fissionable material is in the form of long uranium metal rods or other rods containing a fissionable material positioned in a moderator such as carbon in the form of graphite. The heat of the reaction is controlled and removed by means of water under pressure circulating around and along the uranium rods. As the $94^{239}$ and the various fission products are formed directly in and become part of the uranium rods, it is desirable to support the rods in such a manner that the irradiated rods may be easily removed from the reactor and new rods substituted. Furthermore, each rod must be disposed in the reactor so that the coolant will not leak during operation.

It is therefore an object of this invention to provide a novel apparatus for supporting a fissionable rod in an easily removable manner in a neutronic reactor and at the same time sealing the rod against leakage of coolant and locking it in said reactor.

When a neutronic reactor is in operation, certain radiation emanating from it may be harmful to operating personnel. Therefore, it is desirable that the uranium rods be supported in such a way that they can be easily inserted in and removed from the reactor and placed in a radiation absorbing container without exposure of operating personnel thereto.

It is another object of our invention to provide apparatus for supporting, sealing, and locking uranium rods in a neutronic reactor wherein said supporting and locking apparatus may be operated from a distance.

Still another object of our invention is to provide apparatus for supporting a fissionable rod in a neutronic reactor so that said rod may be removed from the reactor and placed in a safe container without exposing said rod to operating personnel.

The above and other objects, features and advantages of our invention and the aspects of novelty residing in the arrangements of parts and details of constructions will be more fully understood by reference to the following detailed description of the invention taken in connection with the accompanying drawings in which:

Fig. 2 is an enlarged side elevational view partially in cross-section of a portion of the neutronic reactor showing additional details of the supporting cover;

Fig. 3 is a plan view partially in cross-section taken on line 3—3 of Fig. 2;

Fig. 4 is an elevational view partially in cross-section taken on line 4—4 of Fig. 2;

Fig. 5 is an elevational view partially in cross-section of a portion of a neutronic reactor equipped with a second type of supporting cover and a coffin serving as an enclosure for radioactive products;

Fig. 6 is a plan view partially in cross-section taken on line 6—6 of Fig. 5.

Fig. 7 is an elevational view of the coffin and supporting cover partially broken away for clarity and taken in the direction of the section line 7—7 of Fig. 5.

Figure 1:
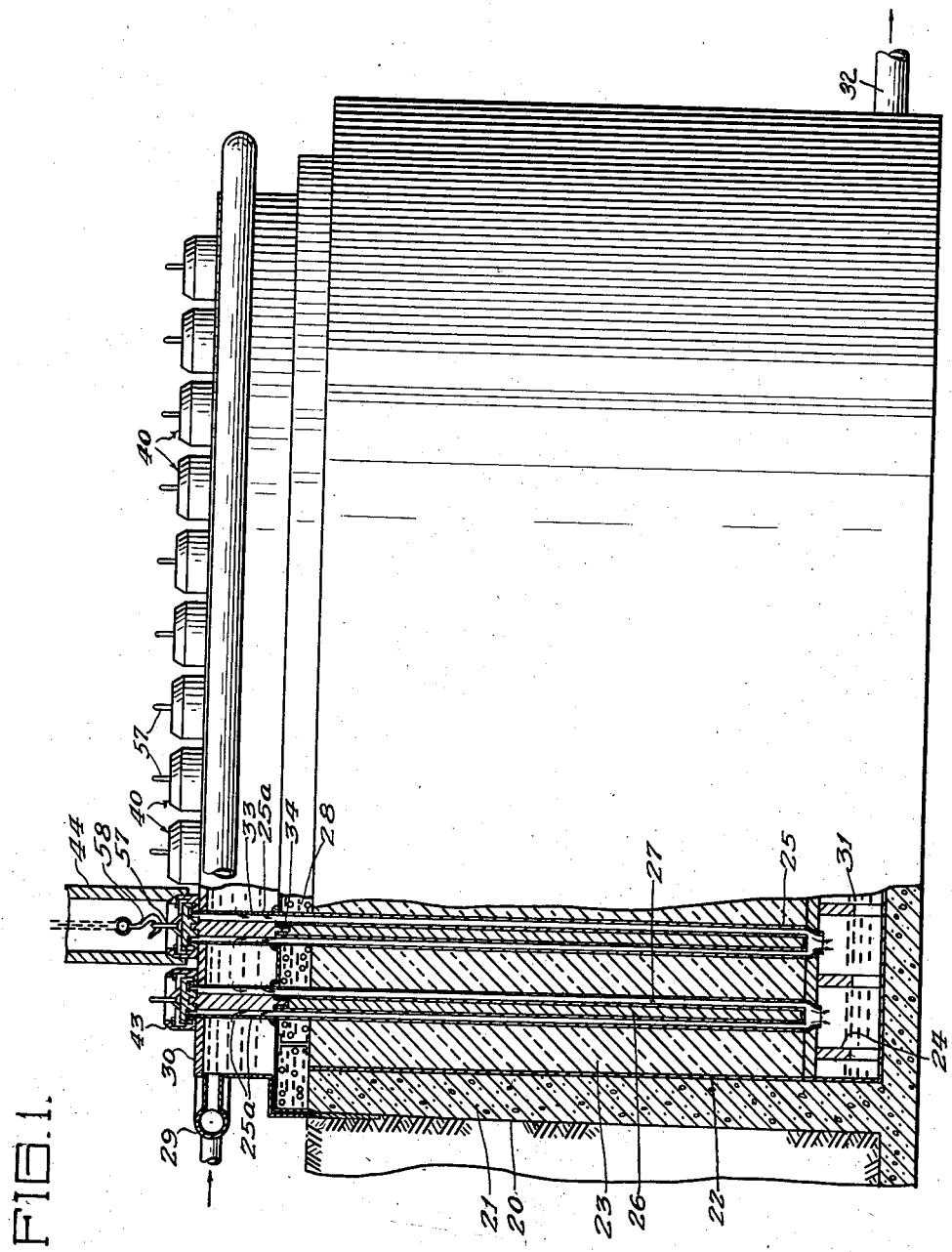
Fig. 1 is a side elevational view partially in cross-section of a neutronic reactor equipped with one type of our improved supporting cover.

Referring generally to a preferred embodiment of the invention shown in Fig. 1, a plurality of uranium rods are suspended in a neutronic reactor by means of supporting covers that may be automatically sealed and locked in a closed position and unlocked for removing the rod from the pile by the straight line reciprocal movement of a hoisting mechanism. More particularly, a neutronic reactor, generally designated 20, is enclosed in a casing 21 of concrete or other suitable material serving as a gamma ray and neutron shield. A metal tank 22 is positioned in casing 21; and in said tank a quantity of carbon in the form of graphite 23 is supported by a metal framework 24. Also supported by the framework 24 are a plurality of aluminum tubes 25 inserted in channels formed in the graphite 23 with the upper end of each tube extending above the graphite. The tubes 25 are reduced in diameter at their lower ends so that water flowing through the tubes may be maintained under pressure. Suspended in each tube 25 by means that will be further described hereinafter is a uranium rod 26 covered by a sheath 27 of aluminum or other suitable metal, each rod 26 being spaced from the walls of the respective tube. Directly above the carbon lattice 23 is a biological shield 28, comprising lead shot and water, that is used to intercept radiation such as gamma rays and neutrons developed within the reactor. The neutronic reactor 20 is cooled by water under pressure circulated from an inlet pipe 29 to a header 30 mounted above the shield 28, then through openings 25a in the sides of tubes 25 and through the spaces between the uranium rods 26 and the tubes 25, down to a sump 31 and out the outlet pipe 32. The casing 21 is closed by the biological shield 28 and the header 30. The openings in the biological shield and the header through which the tubes 25 extend constitute apertures in the casing 21.

Each uranium rod is supported from the top by means of an aluminum rod 33 that extends from the top of the water header 30 into the biological shield, the aluminum rods 33 being secured to the uranium rods 26 by a threaded portion 34 or other means. In turn, each aluminum rod 33 is supported by a cover assembly 40 that is secured to the top of header 30.

A preferred form of cover assembly 40 is shown in Figs. 2, 3, and 4 in the locked position atop the reactor. The cover assembly includes an annular member 41, hereinafter called a cover seat, provided with screw threads 42, by which it is secured to tube 25. Cover seat 41 is also secured to the top of header 30 by welding or brazing. The upper portion 45 of cover seat 41 is beveled, as shown at 43, so that it will fit snugly into the lower end of a long cylindrical rod container 44, sometimes called a coffin, the purpose of which will be pointed out hereinafter. The interior of the cover seat 41 is provided with an annular groove 46 forming a rounded shoulder 47 in the upper portion 45. The bottom of the cover seat 41 is formed with an internal annular groove 48 in which is positioned a washer 49 of neoprene or other resilient sealing material.

The removable portion of the cover assembly 40 includes a cover 50 for the tube 25 that is generally cylindrical in shape, with a depending plug 60 that fits loosely inside aluminum tube 25, and is provided with a threaded socket 62 into which the aluminum rod 33 is screwed. Concentric with plug 60 is formed a dependent annular flange 63 of such a thickness that it will fit freely into annular groove 48 allowing the bottom of flange 63 to rest on washer 49 forming a water-tight seal.

The top surface 51 of the cover 50 is flat at the outer edge while the center portion is in the form of a shallow inverted cone-shaped depression.

The cover 50 is locked to the cover seat 41 by means of a plurality of reciprocable locking bolts 52 that in the outermost position engage shoulder 47, and in the innermost position will pass freely inside said shoulder. Three such locking bolts are shown, but any desired number may be used. Each bolt 52 is beveled on its upper outer end so that it will slide under the rounded edge of shoulder 47 and is provided with a downwardly extending catch 54 for stopping its inward movement at a point where it will clear shoulder 47 when lifted upward.

The bolts 52 are guided by loops or guides 55 positioned about and welded to the outer periphery of the top of cover 50. The reciprocating mechanism for bolts 52 that raises the cover 50 and rod 26 comprises a lifting member 56 provided on its upper end with a massive handling ring 57 for engagement by a hook 53 of a hoist, not shown, and with three arms 157 each of which are pivotally connected at its lower end to links 58 that are in turn pivotally connected to locking bolts 52.

When the cover 50 is in the locked position as shown in Fig. 2, links 58 are at an angle below horizontal with the arms 157 of the lifting member 56 resting on surface 51. With the lifting member in this position, bolts 52 cannot be pushed inward, since any inward motion is resisted by the links that tend to move downward and inward along surface 51, but are prevented from moving inward by the furcated member 56.

In order to unlock cover 50, the hoist hook 53 is pulled upward, raising the lifting member 56, pivoting links 58 upward around their outer pivots, and pulling bolts 52 inward guided by guides 55 until catches 54 contact the side of cover 50 at which position said catches will clear the inner periphery of shoulder 47 and the cover 50 is pulled up and out of cover seat 41 carrying the uranium rod 26 with it.

As the cover 50 and rod 26 move upward, they enter the rod container or coffin 44 that may be in the form of a heavy lead tube with its lower end beveled as shown to fit the beveled surface 43 of cover seat 41 and form a water-tight seal. The coffin which is supported by the hoist is long enough to completely enclose cover 50, aluminum rod 33 and the uranium rod 26 in telescopic relation so that the coffin acts as a shield to limit or prevent escape of radiation from the irradiated rod 26. After drawing the rod into the coffin, the hoist may then move the coffin containing the rod assembly to a safe place for further processing at which place the rod 26, aluminum rod 33, and cover 50 are dropped out of coffin 44 by disengaging the hook 53 from the ring 57. A new rod 26 provided with a duplicate cover 50 and supporting assembly is then engaged by the hook 53, pulled into the coffin 44 and dropped over the opening in member 41. As the hoist lowers the assembly, the coffin contacts the beveled surface 43 and forms a water-tight seal therewith while the rod 26 enters the reactor and is lowered until the dependent flange 63 of cover 50 rests on the washer 49. The downward movement of cover 50 is thus halted, but the hook 53 continues to move downwardly, allowing the massive eye 57 by its weight to force links 58 to pivot so that locking bolts 52 are forced outwardly under shoulder 47, thus locking cover 50 to cover seat 41. While I have described the preferred mode of introducing the rods 26 into the reactor, the rods, prior to irradiation, may be lowered into and locked within the reactor without use of the coffin 44 although such use is helpful in guiding the rod into the apertured cover seat 41.

The water pressure is reduced when a tube is removed from the reactor so that only a small amount will flow over the top of cover seat 41 when the cover 50 is removed.

Another embodiment of our invention is disclosed in Figs. 5, 6, and 7. While the embodiment shown in Fig. 2 may be operated by a flexible chain or cable, the present embodiment is operated by a rigid rod or other torque transmitting member extending the length of the coffin.

As shown in the drawings the cover assembly 101 comprises an annular cover seat 102 and a removable plug type cover 103. The cover seat 102 is secured to tube 25 and also to the top of the reactor header 30 by welding or brazing. The lower interior of cover seat 102 is machined to form a plug seat 104. The upper internal periphery of the cover seat 102 is formed into a plurality of wedge-shaped lugs 105; while the upper exterior is beveled to match the interior of coffin 44.

The removable cover 103 comprises a plug 106 provided with a screw threaded socket 107 in its bottom, into which aluminum rod 33 is screwed. The lower portion of the plug 106 is machined to provide a snug, water-tight fit in plug seat 104. A circular cavity 108 is formed in the top of plug 106 and partially covered by an annulus 109, that is secured to plug 106 by screws 110.

The lower end of a screw 112 passes through the hole in annulus 109 and is prevented from being withdrawn from said annulus by a pin 113 positioned through the screw 112 and projecting outwardly therefrom. The upper portion of screw 112 is formed into a handling member 117 into which is inserted the hook 118. Threaded onto screw 112 is a spider 114, the periphery of which is cut to provide a plurality of wedge-shaped recesses to match the lugs 105, so that the spider 114 will pass between lugs 105, when in the position shown in Figs. 5 and 6; but when turned 60° from this position by the rotation of screw 112 the uncut portions of the periphery of the spider are aligned under the lugs 105. Stops 115 on the underside of lugs 105 halt the rotation of the spider when it has reached the aligned position. The rotation of screw 112 is continued, effecting relative separation of the spider 114 and the plug 106 so that the plug is forced with a water-tight fit into the plug seat 104.

The apparatus is shown in the drawing, Figs. 5 and 6, with the uranium rod 26 and cover 103 inserted in the reactor and ready for locking. In order to lock the cover 103 to the cover seat 102, hook 118 is rotated by a rod, not shown, that extends the length of the coffin 44 causing screw 112 to turn. Because of friction between the threads of the screw and spider, spider 114 will also turn until its contacts stops 115. The rotation of the screw is continued until plug 106 is firmly seated in plug seat 104.

In order to remove a rod from the pile, the hook 118 is rotated in the opposite direction. This causes relative movement of the spider 114 and the plug 106 towards each other so that the spider 114 no longer contacts the lugs 105. Thread friction causes spider 114 to turn with the screw 112 until the spider contacts the opposite sides of the stops 115, in which portion the spider will pass between the lugs 105, and the hook 118 may be lifted carrying the cover assembly 101 with its attached rod out of the cover seat 102 and into the coffin 44 as explained above.

Obviously, many changes and modifications will be apparent to those skilled in the art. The description is intended to be illustrative only, and the scope of the invention is to be limited only as required by the following claims.

What is claimed is:

1. In combination with a neutronic reactor, a casing for said reactor provided with an aperture, a cover seat provided with an annular groove surrounding said aperture, an internal shoulder on said cover seat, a cover, a dependent annular flange on said cover adapted to fit into the annular groove of the cover seat, a reciprocable bolt on said cover adapted to engage said internal shoulder for locking said cover to said cover seat, a handling member, and means to reciprocate said bolt by the vertical reciprocation of said handling member.

2. In combination with a neutronic reactor having a casing, a tube extending above said casing, a cover seat surrounding said tube and secured thereto, a cover for sealing the upper end of said tube and for suspending a uranium rod, means for locking and sealing said cover to said cover seat including a radially reciprocable bolt on said cover adapted to engage said cover seat, a link pivotally secured to said bolt and a handling member pivotally secured to said link so that the bolt is reciprocated to engage said cover seat by the downward movement of said handling member, and reciprocated to disengage said cover seat by the upward movement of said handling member.

3. In combination with a neutronic reactor having a casing provided with an aperture, a cover seat secured to said casing and surrounding said aperture, a series of lugs on the interior of said cover seat, a cover adapted to fit said cover seat, a member adapted to enter said cover seat when in one position, and to lock under said lugs when rotated from said position, and a screw connecting said cover to said member so that the cover may be sealed to said cover seat by rotating said screw.

4. In combination with a neutronic reactor, a casing for said reactor provided with an aperture, a removable rod adapted to support a uranium part extending into said reactor, a container for receiving said rod as the rod is being removed from the reactor, a member providing a cover seat around said aperture, said cover seat engaging the lower end of said container, a cover attached to said rod, and means for locking and sealing said cover to said cover seat.

5. In combination with a neutronic reactor, a casing for said reactor provided with an aperture, a member providing a cover seat around said aperture, a cover from which a uranium rod is adapted to be suspended, means for locking said cover to said cover seat, and a container into which said rod is drawn as the rod is removed from the reactor, said container engaging the exterior of said cover seat.

References Cited in the file of this patent

UNITED STATES PATENTS

| | | |
|---|---|---|
| 614,732 | Laseman | Nov. 22, 1898 |
| 622,615 | Fleming | Apr. 14, 1899 |
| 1,288,048 | Kunkle | Dec. 17, 1918 |
| 1,560,489 | Yager | Nov. 3, 1925 |
| 1,921,248 | Carpenter | Aug. 8, 1933 |
| 2,097,769 | Mitscherling | Nov. 2, 1937 |
| 2,206,634 | Fermi et al. | July 2, 1940 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

Smyth: "Atomic Energy for Military Purposes," pp. 103, 104, August 1945. (Copy may be purchased from the Supt. of Doc., Wash. 25, D. C.)

Kelly et al.: Phy. Rev. 73, 1135–9 (1948).